(12) United States Patent
Barnes

(10) Patent No.: US 11,981,041 B2
(45) Date of Patent: May 14, 2024

(54) CABLE MEASUREMENT SYSTEM AND CUTTER APPARATUS

(71) Applicant: Joseph David Barnes, Concord, CA (US)

(72) Inventor: Joseph David Barnes, Concord, CA (US)

( * ) Notice: Subject to any disclaimer, the term of this patent is extended or adjusted under 35 U.S.C. 154(b) by 449 days.

(21) Appl. No.: 17/523,860

(22) Filed: Nov. 10, 2021

(65) Prior Publication Data

US 2022/0143855 A1 May 12, 2022

Related U.S. Application Data

(60) Provisional application No. 63/111,812, filed on Nov. 10, 2020.

(51) Int. Cl.
| | | |
|---|---|---|
| *B26B 27/00* | (2006.01) | |
| *G01D 5/04* | (2006.01) | |
| *H02G 1/12* | (2006.01) | |
| *G08B 7/06* | (2006.01) | |

(52) U.S. Cl.
CPC .............. *B26B 27/00* (2013.01); *G01D 5/04* (2013.01); *H02G 1/1217* (2013.01); *G08B 7/06* (2013.01); *H02G 1/1297* (2013.01)

(58) Field of Classification Search
CPC ............................... H02G 1/1217; G01D 5/04
USPC .................................................. 30/90.1–91.2
See application file for complete search history.

(56) References Cited

U.S. PATENT DOCUMENTS

| | | | | |
|---|---|---|---|---|
| 4,570,348 A | | 2/1986 | Amsler | |
| 5,065,527 A | * | 11/1991 | Shaw | G01B 5/043 33/747 |
| 5,257,462 A | | 11/1993 | Buttermann | |
| 5,435,029 A | * | 7/1995 | Carlson, Jr. | H02G 1/1292 140/123 |
| 6,129,796 A | * | 10/2000 | Steinberg | G09F 3/0288 156/522 |

(Continued)

FOREIGN PATENT DOCUMENTS

| | | |
|---|---|---|
| DE | 19958440 | 9/2000 |
| GB | 2487439 A | 7/2012 |

OTHER PUBLICATIONS

ETape 16, Digital Electronic Tape Measure, Retrieved from Amazon, Aug. 14, 2019.

(Continued)

*Primary Examiner* — Sean M Michalski

(57) ABSTRACT

A cable measurement system and cutter apparatus has a housing, a display device, a material conduit, a rotary encoder, a cutting tool handle a resistance member a movable cutting blade and a blade aperture. The cutter system is able to measure the length of a cable that passes through the material conduit which traverses through the housing. The display device is mounted onto the housing and is coupled to the rotary encoder which measures the length of cable passed through the housing. The encoder is mounted next to the conduit so that the cable is measured, and the length is displayed on the display device. one end of the cutting tool handle is rotatably mounted to the housing and the movable blade is mounted onto the opposite end of the handle. The blade is able to cut the cable by moving through the blade aperture which traverses through the conduit.

18 Claims, 11 Drawing Sheets

(56) References Cited

U.S. PATENT DOCUMENTS

| | | | |
|---|---|---|---|
| 6,675,458 B1 * | 1/2004 | Davidson | G02B 6/245 |
| | | | 83/947 |
| 7,216,439 B2 * | 5/2007 | Thompson | G01B 5/043 |
| | | | 33/735 |
| 7,350,313 B2 * | 4/2008 | Laurent | B23D 29/023 |
| | | | 33/666 |
| 7,458,170 B1 | 12/2008 | Richardson | |

OTHER PUBLICATIONS

Digital Line Counter Retro Assembly, Retrieved from Internet, Retrieved on Sep. 25, 2020.

* cited by examiner ically skilled individual, including greater or lesser inner
CABLE MEASUREMENT SYSTEM AND CUTTER APPARATUS The current application claims a priority to the U.S. Provisional Patent application Ser. No. 63/111,812 filed on Nov. 10, 2020.

FIELD OF THE INVENTION

The present invention generally relates to the field of handheld measurement tools, specifically relating to a means of measuring and cutting ductile materials to a desired length using a combined handheld implement.

BACKGROUND OF THE INVENTION

Tennis racquets, or other analogous sporting equipment comprising a woven tensile mesh strung across a frame, are commonly restrung to repair worn strands or to adjust the tension of the mesh to suit personal preference. Cutting strands to size accurately can be difficult—individual strands can span twenty feet or more, individually. Failure to properly measure each strand may leave a user with a shortage at the end of a weave, requiring that a racquet be completely unwound before reattempting the weaving process. To avoid this, the strands are commercially available in pre-cut packages corresponding to a known racquet profile and strand length. However, the same strands are available at a lower price-per-length in bulk reels. This market reality is additionally observed in other ductile materials (electrical cables, baling wire, fencing material, etc.) wherein a manufacturer does not post-process their product beyond the bulk packaging around a spool (or comparable winding element). It is therefore proposed that a means and implement to accurately measure and sever a contiguous strand of string (or comparable ductile/tensile material) is desirable to drive down the unit cost of restringing a tennis racquet, or any other activity involving precise lengths of stranded material.

SUMMARY OF THE INVENTION

The present invention comprises a shell, a jaw assembly, a material conduit assembly, a driven wheel, and a measurement system. The shell defines a rigid, bisected structure suitable for containing the material conduit assembly, the driven wheel, and the measurement system while also providing a pivot position for the jaw assembly. Accordingly, the jaw assembly defines a mobile structure fixed to the shell at a distal corner of the exemplary model. The jaw is biased into an open position against the shell by a spring element mounted between the jaw assembly and the shell, ideally constituting a coil spring fixed about the pivot position. The articulation of the jaw assembly is limited by a set of captive protruding structures extending into the shell, preventing separation of the shell and the jaw unless the shell is disassembled across a central bisecting seam. This capacity for disassembly enables the correction of any malfunction of the material conduit assembly, i.e., if the length of material drawn through the material conduit assembly becomes jammed or entangled. The material conduit assembly itself defines a self-adjusting channel traversing the shell laterally. In addition to the exemplary model shown, it is suggested that the material conduit assembly may be manufactured to any standard or dimensions as may be realized by a reasonably skilled individual, including greater or lesser inner diameters, and geometrically irregular aperture profiles, without departing from the original spirit and scope of the present invention. The driven wheel defines a measurement wheel operably connected between the material conduit assembly and the measurement system, wherein an outer race of the driven wheel engages into a perforated channel to impinge upon the length of cord and the measurement system receives the rotational value of the driven wheel corresponding to the displacement of the length of cord through the perforated channel. Once a desired length of cord has passed along the driven wheel, a user may then articulate the jaw assembly to sever the cord.

The jaw assembly further comprises a lever body, a first cutter, a first cutter receptacle, a spring perch, and an axle. The lever body defines a substantially hollow structure similar in composition to the shell, containing the first cutter, the first cutter receptacle, the first spring perch, and a material protrusion forming the body of the axle. Accordingly, the axle defines a set of lateral material protrusions extending outwards from the lever body and engaging into the shell to form the pivot and mounting position for the spring element, as described previously. The spring perch defines a retaining structure formed into the interior of the lever body adjacent to the axle, providing a stop for the spring element to act against during articulation of the lever body. The first cutter receptacle defines a concave structure formed laterally across the lever body, ideally formed tangentially to the axle such that the first cutter mounted therein will be brought into a perpendicular position relative to the length of cord along the normal rotational path of the lever body about the pivot position. The first cutter defines an interchangeable cutting implement, ideally chamfered along one planar face to cut the length of cord at a 45° angle to enable easier insertion of the severed end into external grommets or receiving structures. Though the first cutter defines a static cutting implement in the simplest implementation of the present invention, it is contemplated that the first cutter may define a reciprocating head, a thermal cutting tool, a rotating abrasive head, or any other form of cutting implement as may be suitable for use with various types of cord material. According to the exemplary embodiment, the first cutter and first cutter receptacle may be mirrored by a second cutter and a second cutter receptacle positioned within the shell, across the material conduit assembly. The articulation of the jaw via the compression of the lever body into the shell will ideally bring the first cutter and the second cutter together to sever the length of cord positioned between the opposed cutters.

The material conduit assembly comprises an input aperture, an output aperture, the perforated channel, a cutting aperture, at least one primary cord guide, and a secondary cord guide. The input aperture and the output aperture constitute flared perforations formed into the shell on opposite ends of the perforated channel. The primary cord guide defines a set of opposed sheeves engaged into the perforated channel along corresponding perforations, wherein at least one of the opposed sheeves is biased towards the perforated channel along a perpendicular axis. The bias is ideally achieved by mounting the mobile sheeve to an axle carrier mounted into a carrier slot. The axle carrier is fitted with a linear spring element, the spring element acting against a distal end of the slot to force the axle carrier to the opposed proximal end of the carrier slot. This arrangement will enable the primary guide assembly to adjust to varying diameters of cord automatically, as larger-diameter cord will force the guide to separate and lesser diameters are forcibly engaged by the spring-mounted sheeve. Preferably, the secondary cord guide features a positioning arm that presses the cord against the driven wheel. In some embodiments, the secondary cord guide defines a similar arrangement to the primary cord guide, wherein the carrier-mounted sheeve is supplanted by the driven wheel. This will ensure that the driven wheel is in constant contact with the cord, preventing slippage that may introduce error into the measured length of cord. Slippage of the cord past the engagement of the primary cord guide, secondary cord guide, and the driven wheel may be further reduced via the inclusion of a plurality of traction bands mounted to the distal edges of each wheel structure. In at least one embodiment, the traction bands comprise a compressible material to enable the traction band to deform along the circumference of the length of cord along an arbitrary engagement position. Further, the traction bands may bear a plurality of surface distortions, treads, or other traction-enhancing surface formations as may be realized by an individual of ordinary skill.

In the preferred embodiment, the driven wheel engages into the perforated channel along a corresponding aperture of greater dimensions than the conventional sheeves, enabling a larger contact patch to the driven wheel to further reduce slippage. The cutting aperture defines a section of the perforated channel wherein the length of cord traversing said channel is fully exposed on all sides, differentiated from the apertures corresponding to the primary cord guide and secondary cord guide by the removal of the lateral portions of the channel. The cutting aperture is positioned below the second cutter within the shell and exposed to the stroke of the first cutter positioned in the jaw. The accuracy of the cut location may be improved by minimizing the displacement between the tangential contact point of the driven wheel to the cord and the location of the cutting aperture, thereby minimizing the chances for the cord to deflect within the perforated channel or plastically deform along the channel. More specifically, the overall length of the perforated channel traversing the body of the present invention is minimized in at least one embodiment to reduce the possibility of inaccessible material jams within said truncated embodiment of the perforated channel. Further, minimizing contact between the length of cord and the perforated channel may reduce the potential for abrasive damage to a strand of material as it traverses the perforated channel.

Further, the driven wheel may be fitted with at least one eccentric protrusion that may sequentially engage into a fixed cavity as the driven wheel rotates. This engagement produces an auditory and tactile alert that a predetermined length of cord has passed the driven wheel. The desired length per alert is determined by the arc-length between each eccentric protrusion along the distal edge of the driven wheel, e.g., a driven wheel with a diameter of approximately 0.95 inches with 3 equidistant eccentric protrusions radially dispersed about the center of the driven wheel will produce one alert per inch of cord that traverses the perforated channel. This mechanism may be expanded to include larger alert intervals by positioning the eccentric protrusion beyond the diameter of the driven wheel and reducing the number of protrusions in alternate embodiments.

The measurement system comprises an encoder device, at least one incremental processor, a display, and at least one operating button in the broadest conception of the present invention. The encoder device defines a means of converting the rotation of the driven wheel into a compatible input for the incremental processor. Accordingly, the display defines a visual output device suitable for reading the output of the incremental processor and displaying said output in a human-readable format. In the exemplary embodiment illustrated in the attached figures, the encoder defines a digital rotary encoder mounted to the rotational center of the driven wheel. The encoder is operably coupled to the incremental processor, wherein a preset rotational value input from the encoder is converted into a digital value increase. The output value is displayed via the display, ideally constituting a liquid crystal display mounted into the shell. This digitized embodiment further comprises a power supply, ideally a battery cell mounted into the incremental processor. The exemplary embodiment should not be construed as limiting the type or variety of measurement systems that may be introduced in various embodiments of the present invention. In another conceivable embodiment, the encoder defines a worm gear engaged between the driven when and a mechanical assembly configured to progressively advance a series of tumblers bearing numerical markers, constituting the display. The operating button, across various embodiments, will be operably coupled to the incremental processor to reset the stored value relayed by the encoder to '0' to begin measuring a new length of cord. This operating button, or other similar buttons, may also serve as selection controls to alter the measurement units (e.g., inches, feet, centimeters, meters, etc.) on the display and as a power switch in the electrically operated embodiments.

DETAIL DESCRIPTIONS OF THE INVENTION

Figure 1:
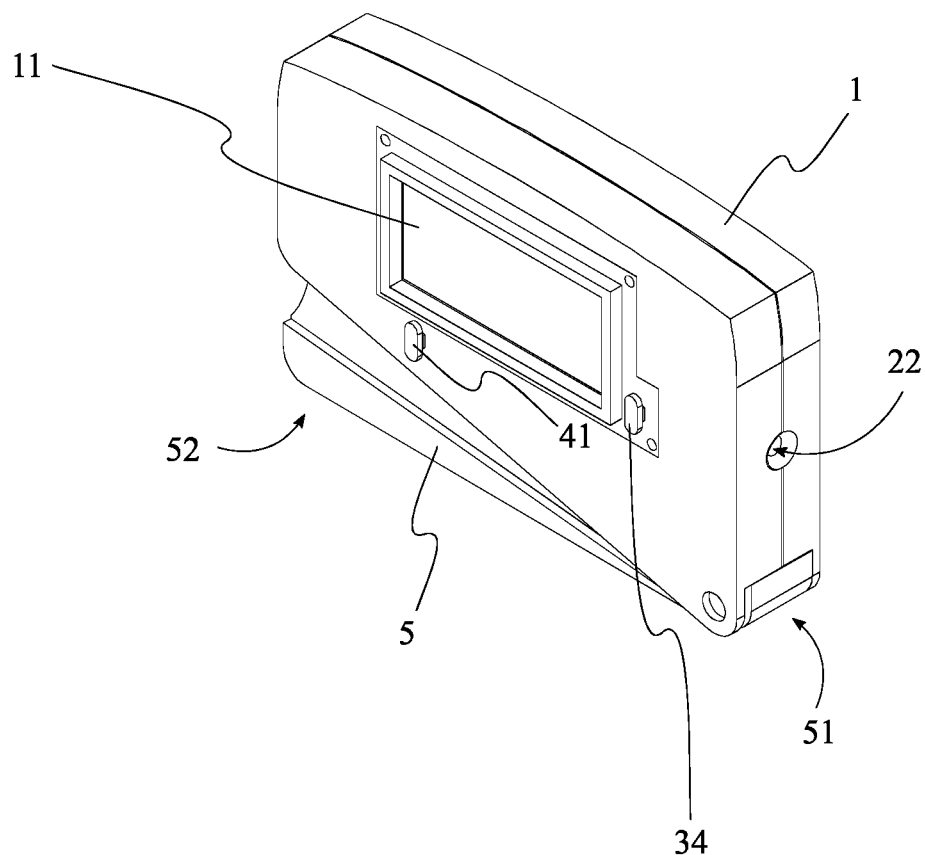
FIG. 1 is an isometric perspective view of the present invention.
Figure 2:
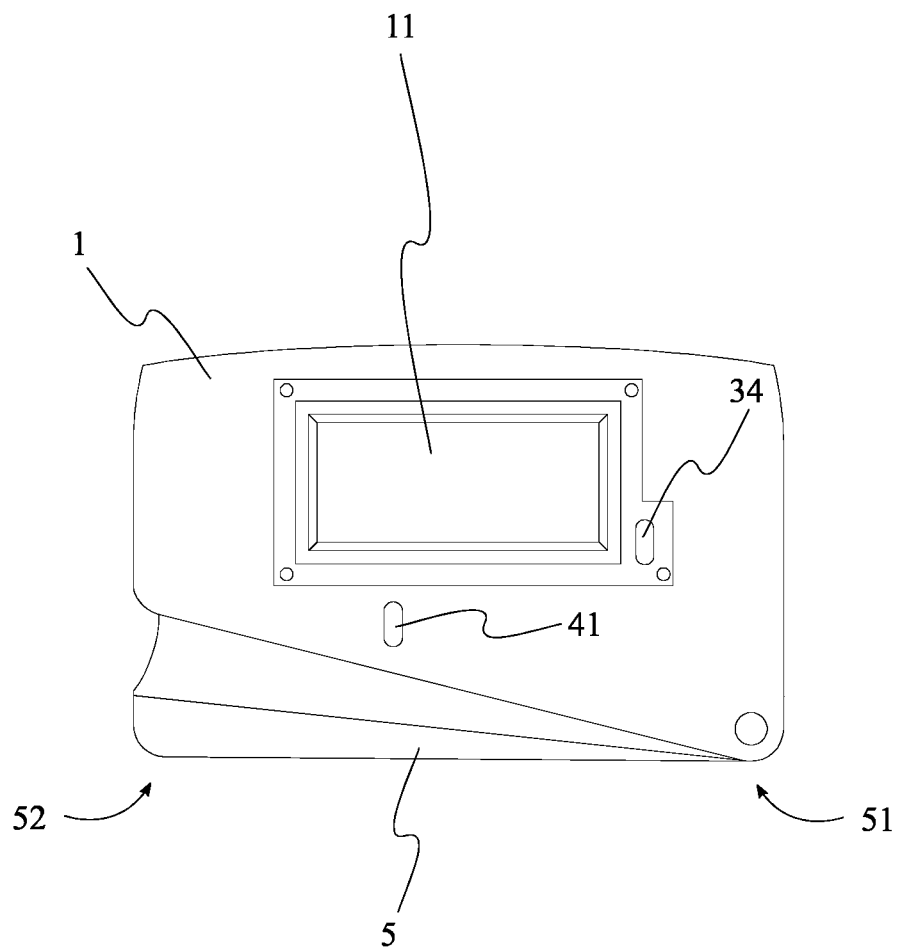
FIG. 2 is a front view of the present invention.
Figure 3:
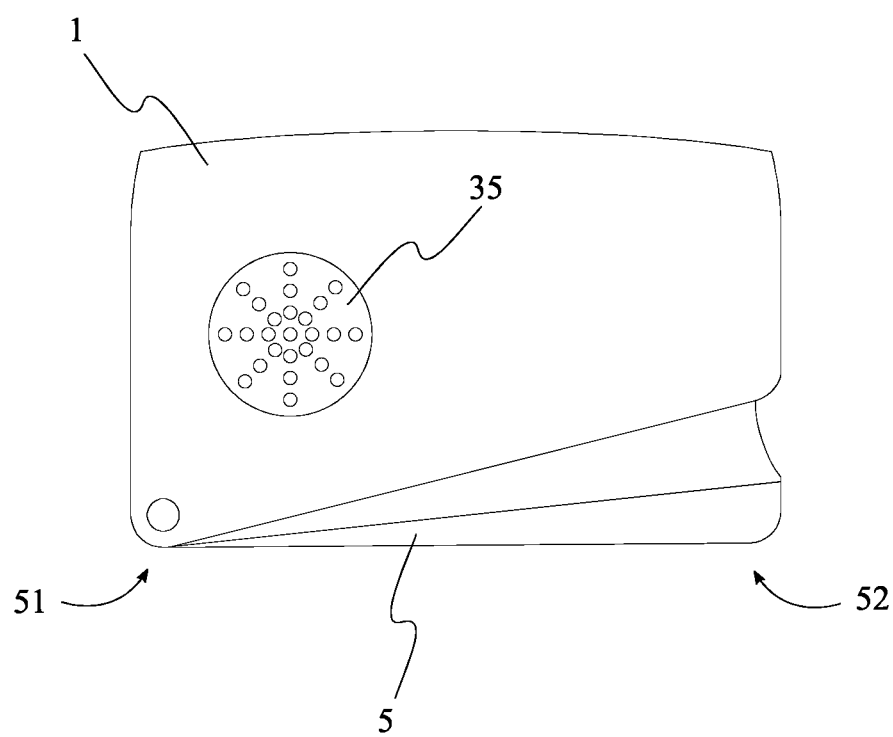
FIG. 3 is a rear view of the present invention.
Figure 4:
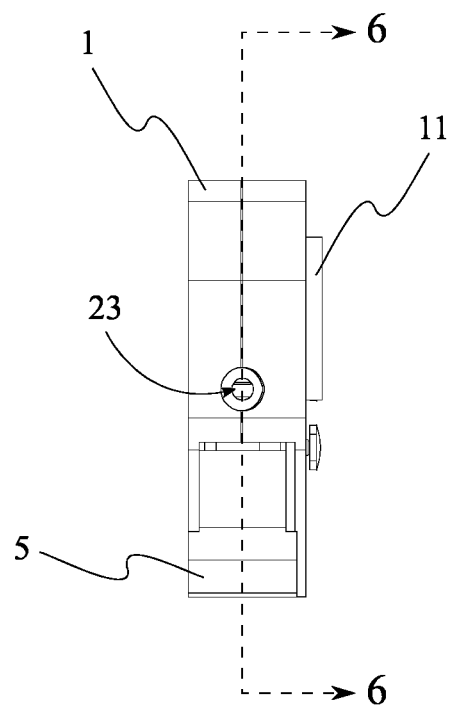
FIG. 4 is a left-side view of the present invention indicating the direction of section cut 6.
Figure 5:
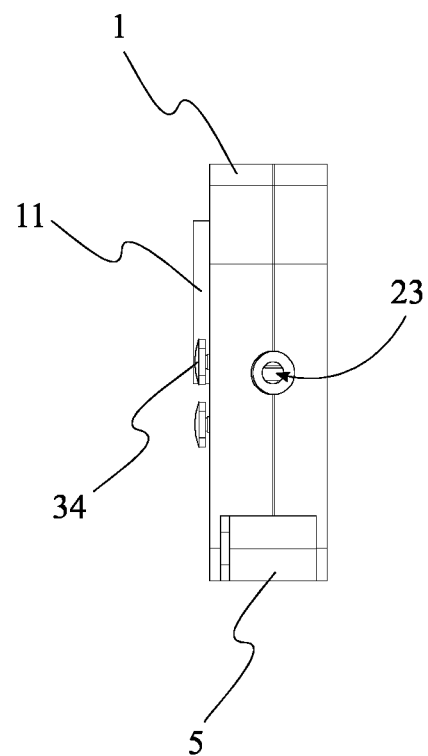
FIG. 5 is a right-side view of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances and should not be considered to be limiting to the scope of the present invention as a whole.

In reference to FIG. 1 through FIG. 11, the preferred embodiment of the present invention is a cable measurement system and cutter apparatus used to precisely cut a desired length of cable. The present invention enables a user to feed lengths of cable with varying diameters. The present invention then measures the fed cable, alerts the user of the length of cable that was fed, and enables the user to cut the cable at the desired length. To achieve this functionality, the present invention comprises a housing 1, a display device 11, a material conduit 2, a rotary encoder 33, a cutting tool handle 5, a resistance member 8, a movable cutting blade 6, and a blade aperture 26. The display device 11 is laterally mounted onto an external surface of the housing 1 so that the user presented with a visual readout that denotes the length of cable passed through the present invention. The material conduit 2 is a tube through which the cable passes when fed into the present invention. Specifically, the material conduit 2 traverses through the housing 1. As a result, the user is able to feed lengths of the cable into one end of the material conduit 2 and pull the cable out of the other end of the material conduit 2. Thereby, passing the length of cable through the housing 1 where the cable is measured. To achieve the measuring functionality, the rotary encoder 33 is mounted adjacent to the material conduit 2, within the housing 1. Accordingly, the rotary encoder 33 is actuated by the cable being fed through the material conduit 2. Additionally, the rotary encoder 33 is coupled to the display device 11 such that the length of cable that is measured is visually output onto the display device 11. In some embodiments, the encoder defines a worm gear engaged between a driven wheel and a mechanical assembly configured to progressively advance a series of tumblers bearing numerical markers, constituting the display. This worm gear is actuated by the length of cable being fed through the material conduit 2.

Preferably, the present invention is a hand-operated tool that uses a movable jaw assembly to actuate the movable cutting blade 6. To that end, a first end 51 of the cutting tool handle 5 is rotatably connected to the housing 1. Consequently, the cutting tool handle 5 forms a pivoting lever that is actuated to cut the cable to the desired length. In some embodiments, the resistance member 8 is a torsion spring that is integrated into the connection between the cutting tool handle 5 and the housing 1. Accordingly, the resistance member 8 biases the cutting tool handle 5 away from the material conduit 2, thereby retracting the movable cutting blade 6 after the desired length of cable is cut. The movable cutting blade 6 is mounted onto a second end 52 of the cutting tool handle 5, opposite to the resistance member 8. Additionally, the blade aperture 26 normally traverses through the material conduit 2. Thus, the movable cutting blade 6 is able to be passed through the cable when the user squeezes the cutting tool handle 5. This configuration enables the resistance member 8 to move the movable cutting blade 6 away from the material conduit 2 so that the user is able to pass additional lengths of cable through the present invention to be measured and cut. In supplemental embodiments, the housing 1 is enveloped in a rubberized or textured liner that improves the user's grip on the present invention. Thus, facilitating use as a hand tool in a variety of working conditions.

Figure 8:
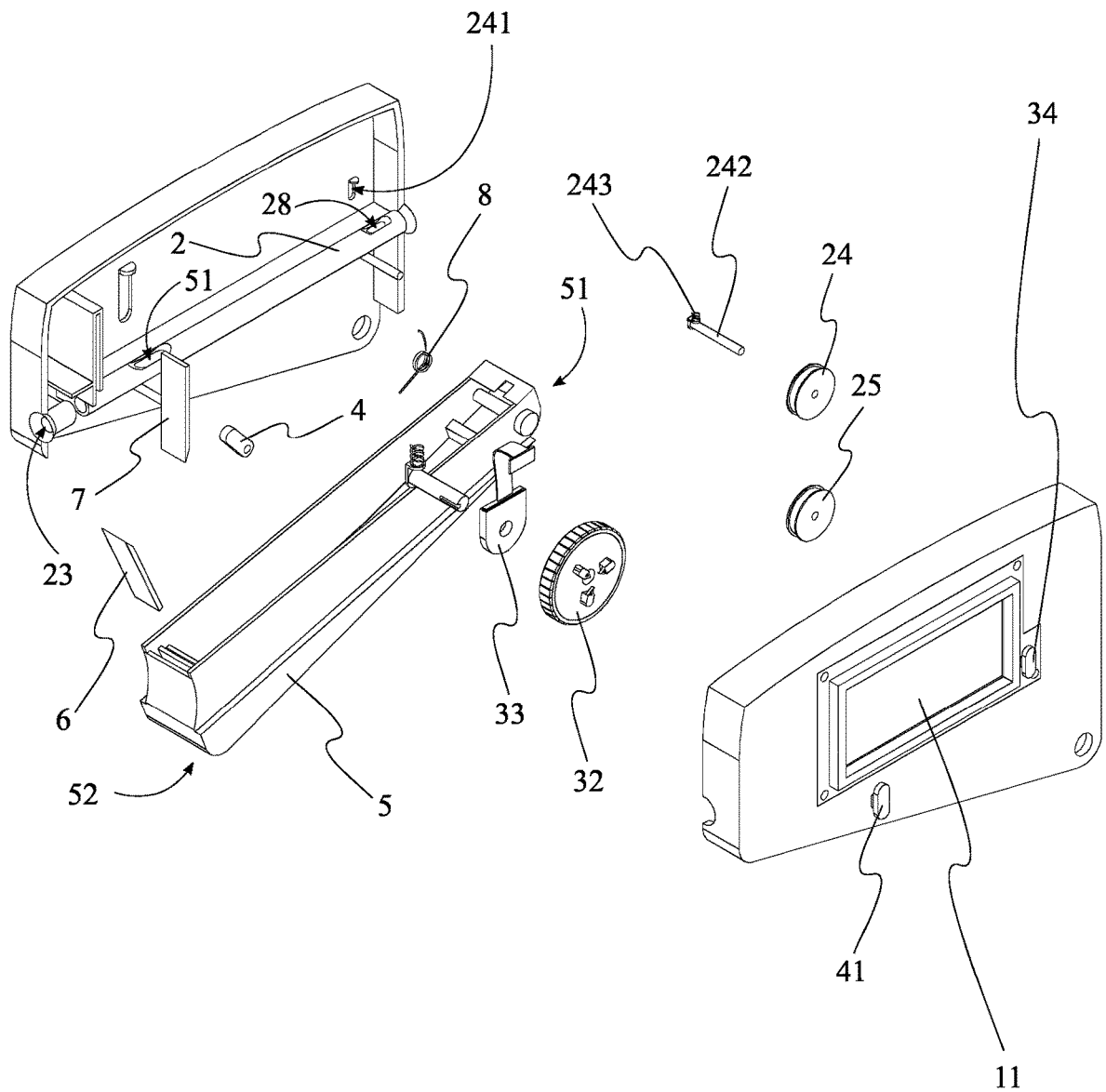
FIG. 8 is an exploded perspective view of the present invention.

In reference to FIG. 1 and FIG. 8, the present invention is designed to prevent the cable from becoming tangled or fouled while passing through the material conduit 2. To facilitate this functionality, the present invention further comprises at least one primary guide wheel 24, at least one secondary guide wheel 25, and a guide wheel aperture 28. The primary guide wheel 24 is rotatably mounted adjacent to an inlet 22 of the material conduit 2. Likewise, the secondary guide wheel 25 is rotatably mounted adjacent to the inlet 22 of the material conduit 2. Additionally, the primary guide wheel 24 is positioned opposite to the secondary guide wheel 25, across the material conduit 2. Further, the guide wheel aperture 28 normally traverses through the material conduit 2, and the primary guide wheel 24 and the secondary guide wheel 25 engage into the guide wheel aperture 28. As a result, the primary guide wheel 24 and the secondary guide wheel 25 are able to clamp around the lateral surface of the length of cable and prevent the cable from becoming tangled and facilitate feeding the cable through the material conduit 2. To further facilitate feeding the length of cable through the material conduit 2, the inlet 22 of the material conduit 2 and an outlet 23 of the material conduit 2 are constructed as conical apertures. Thus, the cable is funneled into the material conduit 2 and easily passes through the primary guide wheel 24 and the secondary guide wheel 25. In some embodiments, a debris-removing liner is superimposed onto the inlet 22 and the outlet 23. The debris-removing liner is a particle gathering device such as a cloth, brush, or electrostatic coating that prevents debris and unwanted particles from entering the housing 1 and causing inaccurate measurements.

Figure 9:
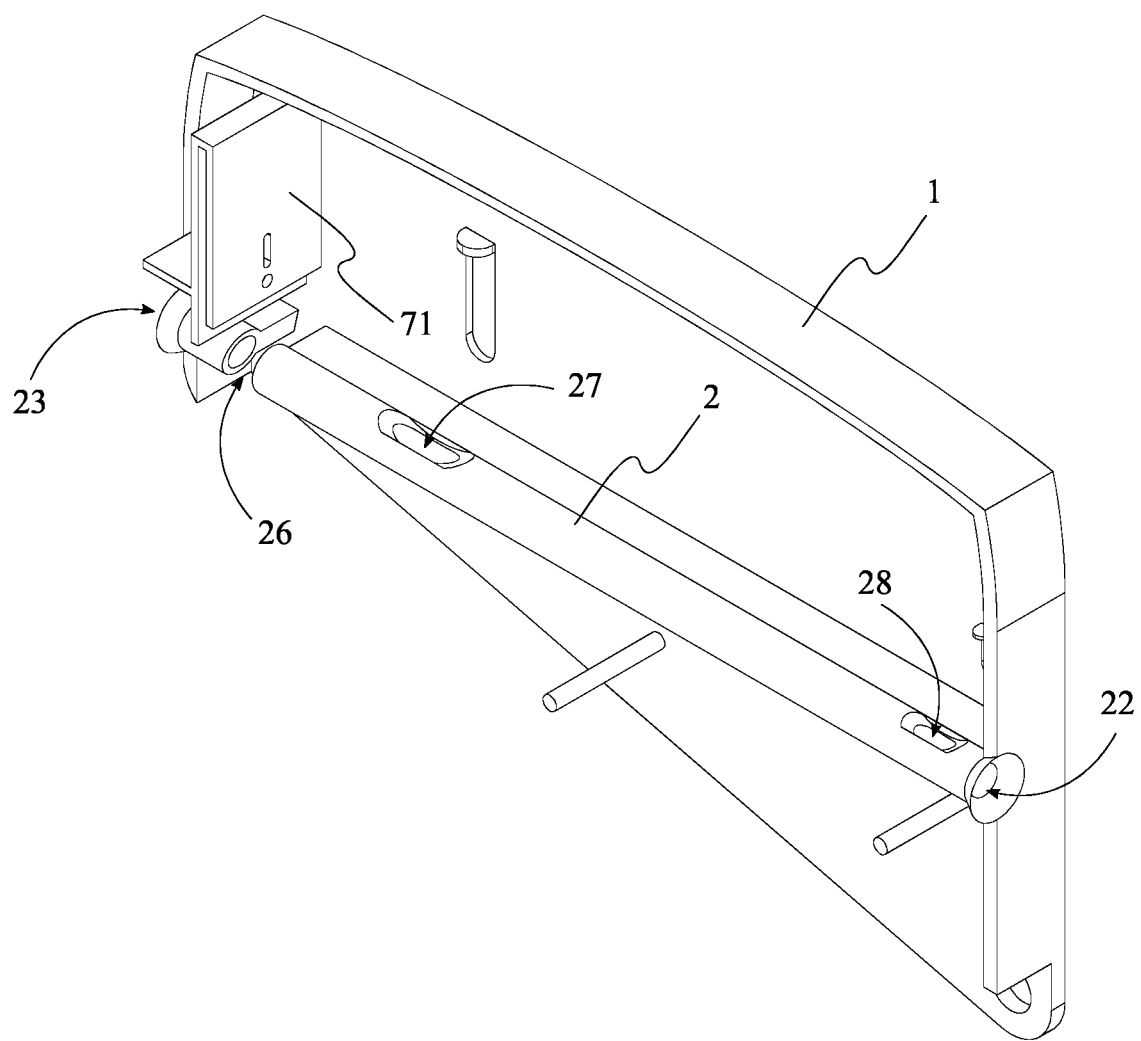
FIG. 9 is a perspective view of one half of the housing used in the present invention.
Figure 10:
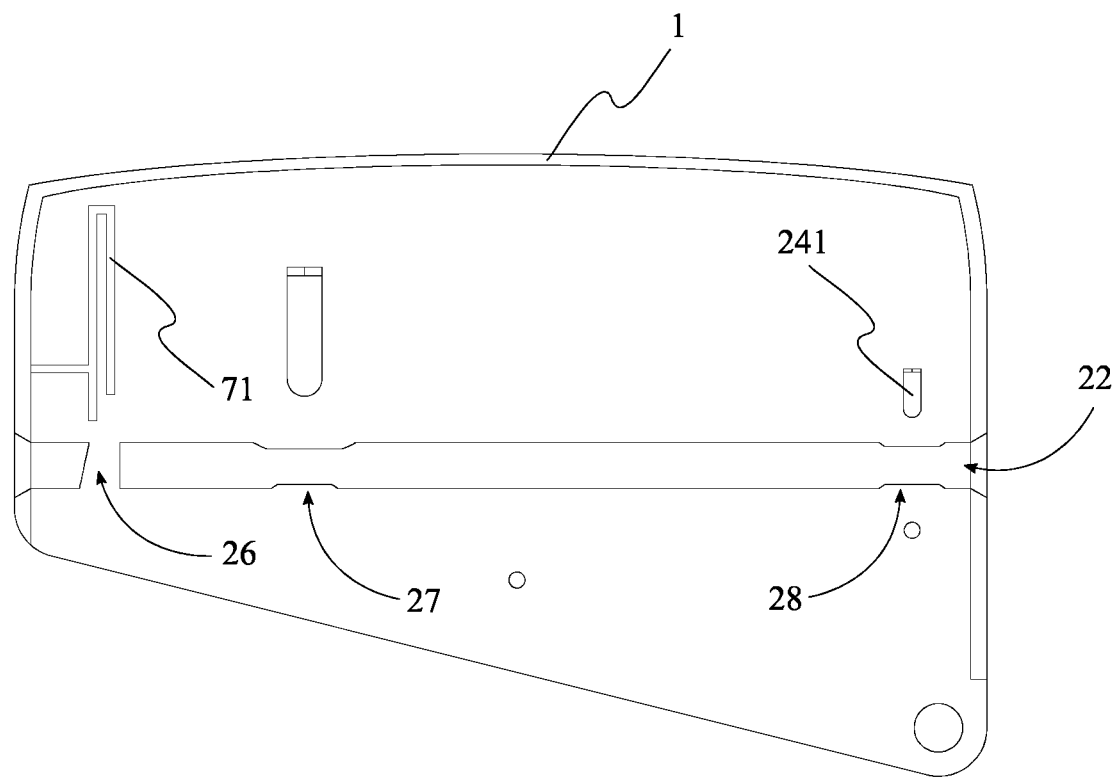
FIG. 10 is a front view of one half of the housing used in the present invention.

In reference to FIG. 8, FIG. 9, and FIG. 10, some embodiments of the present invention are designed to accommodate cables of varying diameter. To facilitate this functionality, the present invention further comprises a displacement slot 241, a guide axle 242, and a linear actuator 243. The displacement slot 241 traverses into the housing 1 to create an area within which the primary guide wheel 24 can be linearly displaced. The guide axle 242 normally protrudes from the primary guide wheel 24 and engages into the displacement slot 241. Thus, the primary guide wheel 24 is able to be linearly displaced and accommodate cables of varying diameter. Preferably, the linear actuator 243 is a compression spring. However, embodiments of the present invention are designed with linear actuators 243 selected from the group comprising, hydraulic cylinders, solenoids, elastic bands, and magnetic repulsion. The linear actuator 243 forces the primary guide wheel 24 to engage into the guide wheel aperture 28 and press against the lateral surface of the cable. Thereby clamping the cable between the primary guide wheel 24 and the secondary guide wheel 25. In supplemental embodiments, the secondary guide wheel 25 is mounted within a secondary displacement slot 241 and is maneuvered by a secondary linear actuator. Thus, the primary guide wheel 24 and the secondary guide wheel 25 are able to be repositioned to accommodate cables of varying diameter.

Figure 6:
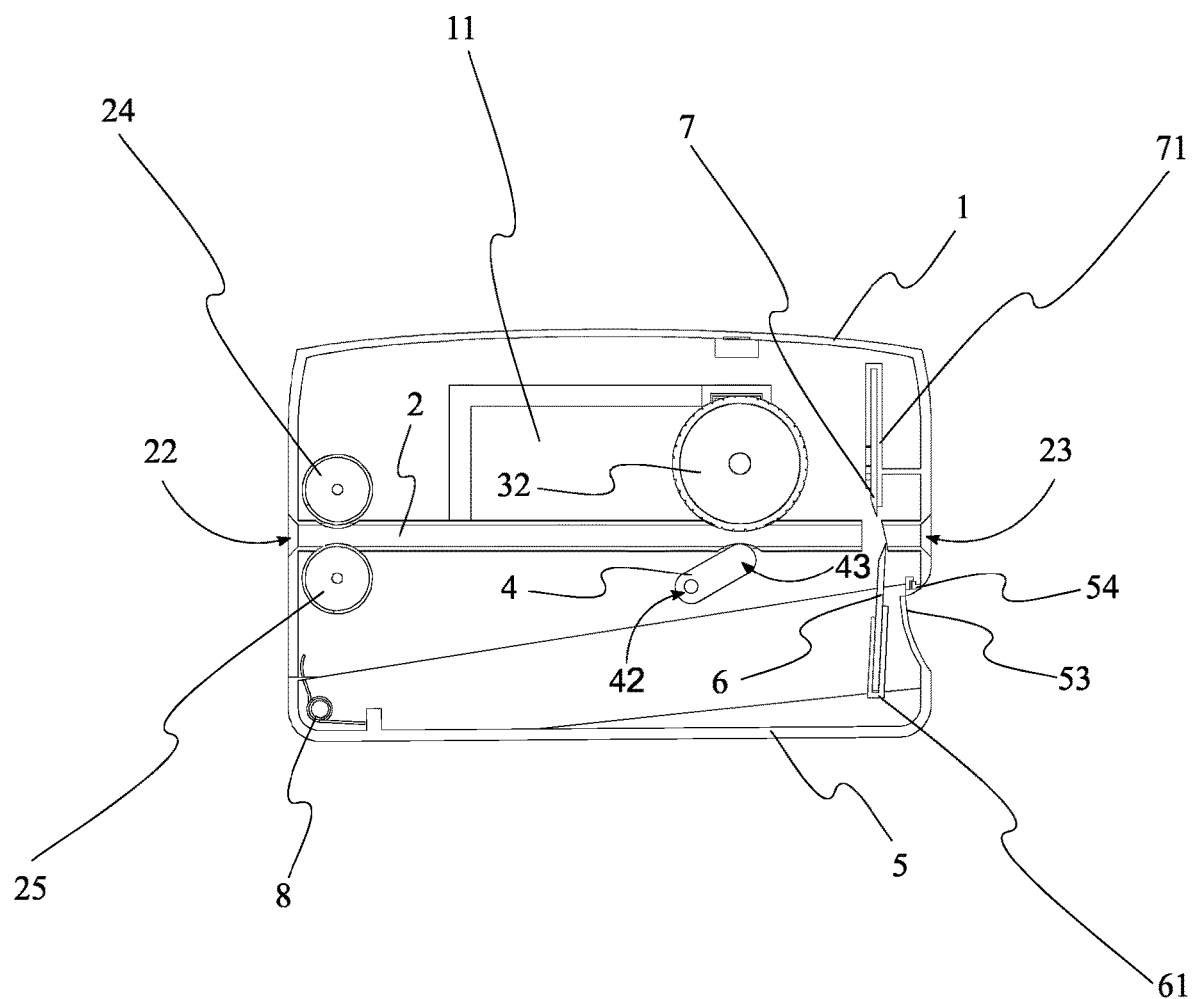
FIG. 6 is a left-side sectional view of the present invention taken along line 6-6 in FIG. 3. In this view the movable cutting blade is positioned offset from the fixed cutting blade.
Figure 7:
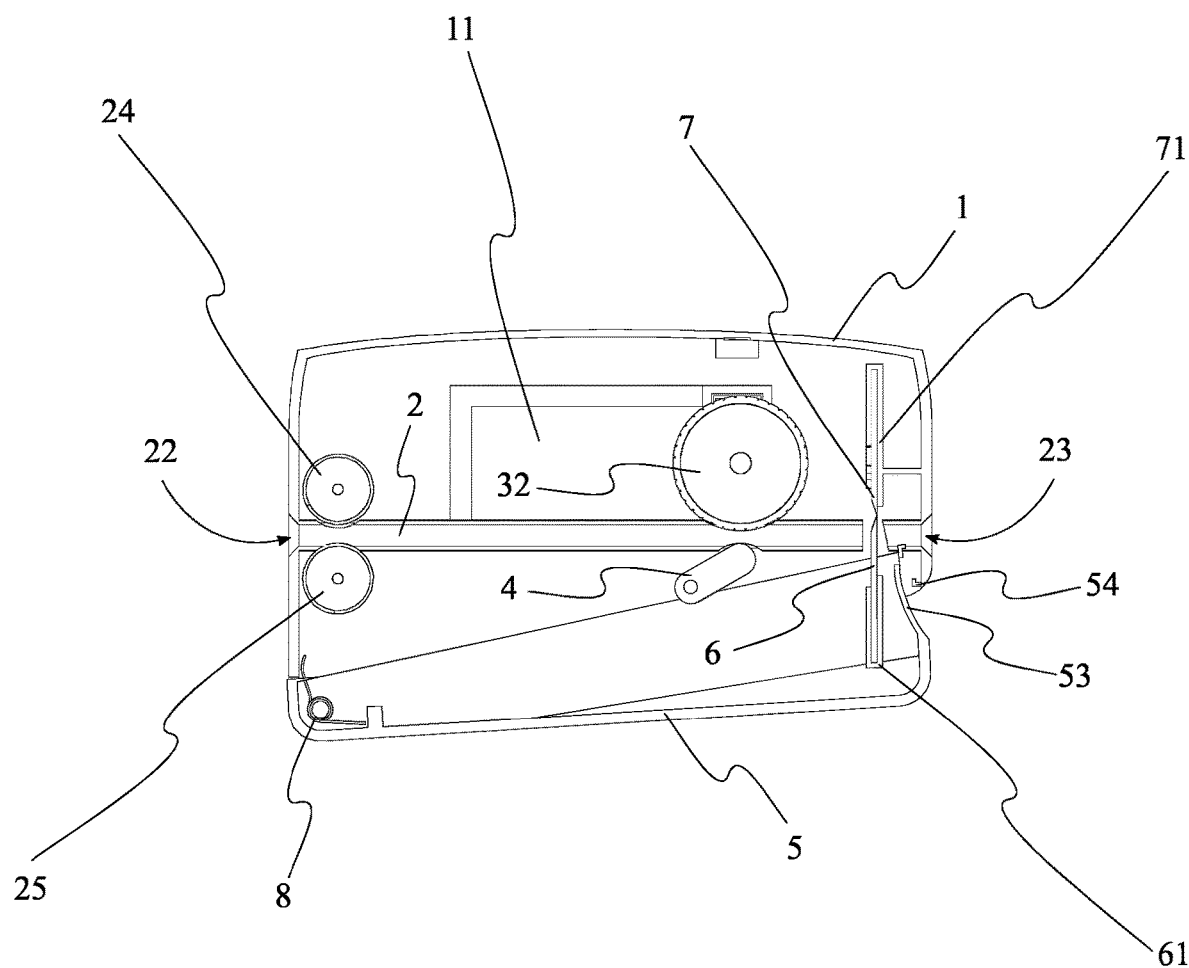
FIG. 7 is a left-side sectional view of the present invention taken along line 6-6 in FIG. 3. In this view the movable cutting blade is positioned offset from the fixed cutting blade.

In reference to FIG. 6 through FIG. 8, the present invention is designed to accurately measure the desired length of cable. To facilitate this, the present invention further comprises a measurement aperture 27, a measurement wheel 32, and an engagement arm 4. The measurement aperture 27 normally traverses through the material conduit 2 to provide an area through which the measurement wheel 32 can contact the cable. The measurement wheel 32 is rotatably mounted within the housing 1 and is positioned offset from an outlet 23 of the material conduit 2. Accordingly, the measurement wheel 32 is able to rotate unhindered. Further, the measurement wheel 32 engages into the measurement aperture 27 and the rotary encoder 33 is rotatably coupled to the measurement wheel 32. Consequently, the measurement wheel 32 is rotated as the length of cable is pulled through the material conduit 2. Further, the rotary encoder 33 is actuated by rotation of the measurement wheel 32. Thus, angular displacement of the measurement wheel 32 is related to the length of the cable that is passed through the material conduit 2. The engagement arm 4 is a biasing device that is used to retain the cable in a desired position within the material conduit 2. As such, a fixed end 42 of the engagement arm 4 is rotatably connected to the housing 1 and a free end 43 of the engagement arm 4 engages into the measurement aperture 27, opposite to the measurement wheel 32. Thus configured, the engagement arm 4 presses the cable against the measurement wheel 32, thereby ensuring that the cable is in constant contact with the measurement wheel 32 as the cable passes through the material conduit 2. Additionally, a biasing spring may be integrated into the rotating connection between the fixed end and the housing 1. The biasing spring forces the engagement arm 4 toward the material conduit 2 and presses the cable against the measurement wheel 32. Preferably, a set of sheeves are mounted around the measurement wheel 32, the primary guide wheel 24, and the secondary guide wheel 25. In supplemental embodiments of the present invention, a support wheel is rotatably attached to the free end 43 of the engagement arm 4 to prevent the cable from becoming tangled while passing through the material conduit 2. In further embodiments, the engagement arm 4 is replaced with a stationary support wheel and an axle of the measurement wheel 32 is mounted within a measurement slot so that the measurement wheel 32 is able to be repositioned and accommodate cables of varying diameter.

In reference to FIG. 7 and FIG. 8, in supplemental embodiments, the present invention further comprises a disengagement mechanism 41. In some embodiments, the disengagement mechanism 41 is a knob that is attached to an axle. Additionally, the disengagement mechanism 41 is operatively coupled to the engagement arm 4, wherein the disengagement mechanism causes the engagement arm 4 to selectively engage into the measurement aperture 27. Specifically, the knob of the disengagement mechanism 41 is mounted outside of the housing 1 and the axle extends into the housing 1 to be mated to the engagement arm 4. The user is able to rotate the engagement arm 4 away from the measurement aperture 27 by rotating the knob of the engagement mechanism 41 in a first direction. Similarly, the user is able to rotate the engagement arm 4 into the measurement aperture 27 by rotating the knob of the engagement mechanism 41 in a second direction. Preferably, the engagement mechanism 41 is a locking device that can be retained in an engaged configuration or a disengaged configuration. While in the disengaged configuration, the engagement arm 4 is disengaged from the measurement aperture 27 and the cable is able to be pulled through the material conduit 2 without being pressed against the measurement wheel 32, thus the length of the cable is not measured. While in the engaged configuration, the engagement arm 4 is engaged into the measurement aperture 27 and the cable is pressed against the measurement wheel 32 while being pulled through the material conduit 2, thus the length of the cable is measured. In further embodiments, the engagement mechanism 41 is a pushrod that moves the engagement arm 4 out of the measurement aperture 27 by laterally displacing the engagement rod 4 within the housing 1. In alternative embodiments, the engagement mechanism 41 is mounted in an engagement slot and the engagement arm 4 is moved into and out of the measurement aperture 27 by linearly displacing the engagement mechanism 41 within the engagement slot.

In reference to FIG. 1 and FIG. 8, the present invention employs a jaw assembly as a hand operated cutting tool. To facilitate achieving accurate and reproducible cuts, the present invention further comprises a fixed cutting blade 7, a first blade receptacle 61, and a second blade receptacle 71. The fixed cutting blade 7 is mounted adjacent to the cutting aperture and the movable cutting blade 6 is aligned with the fixed cutting blade 7. Accordingly, the movable cutting blade 6 and the fixed cutting blade 7 are used to cut the cable when the cutting tool handle 5 is depressed. Specifically, the fixed cutting blade 7 and the movable cutting blade 6 form the two jaws of a clamp where the movable cutting blade 6 presses the cable against the fixed cutting blade 7 to slice the cable at a desired location. Preferably, the fixed cutting blade 7 and the movable cutting blade 6 are each chamfered to a 45-degree angle. Thus, the cable is cut to facilitate threading the cable through a tennis racket or other device. The first blade receptacle 61 and the second blade receptacle 71 are mounting devices which enable the user to remove or replace the fixed cutting blade 7 and the movable cutting blade 6 when the blades become dull or broken. As such, the first blade receptacle 61 is mounted onto the second end 52 of the cutting tool handle 5. Additionally, a blunt end of the movable cutting blade 6 is engaged into the first blade receptacle 61. Consequently, the chamfered edge of the movable cutting blade 6 extends out of the first blade receptacle 61 and is retained in an orientation that facilitates cutting the cable to the desired length. Similarly, the second blade receptacle 71 is mounted adjacent to the cutting aperture and a blunt end of the fixed cutting blade 7 is engaged within the second blade receptacle 71. Thus, the chamfered edge of the fixed cutting blade 7 extends out of the second blade receptacle 71 and is is retained in an orientation that facilitates cutting the cable to the desired length.

In reference to FIG. 6 and FIG. 7, the present invention is designed to function as a hand tool capable of making a series of repeatable cuts. To facilitate this, the present invention further comprises a retention linkage 53 and a retention protrusion 54. The retention linkage 53 is a rigid member that is terminally connected to the second end 52 of the cutting tool handle 5. The retention protrusion 54 is connected adjacent to the outlet 23 of the material conduit 2 and the retention linkage 53 is operatively coupled to the retention protrusion 54, wherein the retention protrusion 54 retains the cutting tool handle 5 at an angle of 180 degrees or less, relative to the material conduit 2. As a result, the retention linkage 53 prevents the cutting tool handle 5 from being sufficiently angularly displaced that the movable cutting blade 6 exits the housing 1 and causes damage to the user.

Figure 11:
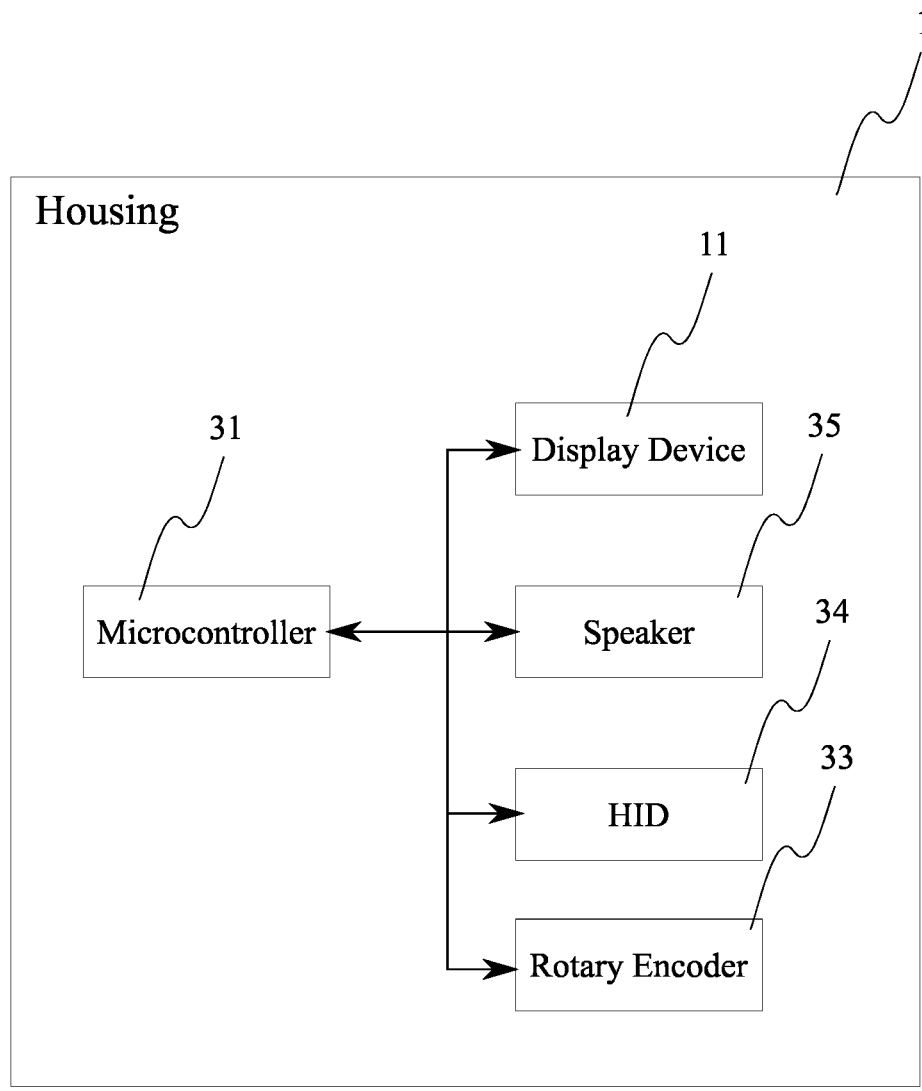
FIG. 11 is a block diagram illustrating electronic connections between the components of the present invention.

In reference to FIG. 8 and FIG. 11, the present invention is designed to enable rapid cable measurement. To facilitate this, the present invention further comprises a microcontroller 31, a speaker, and a human interface device (HID) 34. The microcontroller 31 is mounted within the housing 1. Additionally, the rotary encoder 33, the display device 11, the speaker 35, and the HID 34 are electronically connected to the microcontroller 31. Accordingly, the microcontroller 31 is able to govern the operation of the electronic components of the present invention. The speaker 35 and the HID 34 are laterally mounted onto the housing 1 and positioned offset from the display device 11. As a result, the user is able to deliver commands to the microcontroller 31 through the HID 34 and receive audible alerts from the speaker 35. In some embodiments, the speaker 35 generates an audible alert whenever a user-defined length of cable is passed through the material conduit 2.

Although the invention has been explained in relation to its preferred embodiment, it is to be understood that many other possible modifications and variations can be made without departing from the spirit and scope of the invention as hereinafter claimed.

What is claimed is:

1. A cable measurement system and cutter apparatus comprising:
a housing;
display device;
a material conduit;
a rotary encoder;
a cutting tool handle
a resistance member;
a movable cutting blade;
a blade aperture;
the display device being laterally mounted onto the housing;
the material conduit traversing through the housing;
the rotary encoder being mounted adjacent to the material conduit;
the rotary encoder being positioned within the housing;
a first end of the cutting tool handle being rotatably connected to the housing;
the resistance member being integrated into the rotatable connection between the first end and the housing;
the movable cutting blade being mounted onto a second end of the cutting tool handle, opposite to the resistance member; and
the blade aperture normally traversing through the material conduit.

2. The cable measurement system and cutter apparatus as claimed in claim 1 comprising:
at least one primary guide wheel;
at least one secondary guide wheel;
the primary guide wheel being rotatably mounted adjacent to an inlet of the material conduit;
the secondary guide wheel being rotatably mounted adjacent to an inlet of the material conduit; and
the primary guide wheel being positioned opposite to the secondary guide wheel, across the material conduit.

3. The cable measurement system and cutter apparatus as claimed in claim 2 comprising:
a guide wheel aperture;
the guide wheel aperture normally traversing through the material conduit; and
the primary guide wheel and the secondary guide wheel engaging into the guide wheel aperture.

4. The cable measurement system and cutter apparatus as claimed in claim 2 comprising:
a displacement slot;
a guide axle;
a linear actuator;
the linear actuator being integrated in between the guide axle and the displacement slot;
the guide axle normally protruding from the primary guide wheel;
the guide axle engaging into the displacement slot; and
the linear actuator being integrated in between the guide axle and the displacement slot.

5. The cable measurement system and cutter apparatus as claimed in claim 1 comprising:
a measurement aperture;
a measurement wheel;
an engagement arm;
the measurement aperture normally traversing through the material conduit;
the measurement wheel being rotatably mounted within the housing;
the measurement wheel being positioned offset from an outlet of the material conduit, across the housing;
the measurement wheel engaging into the measurement aperture;
the rotary encoder being rotatably coupled to the measurement wheel; and
a fixed end of the engagement arm being rotatably connected to the housing; and
a free end of the engagement arm engaging into the measurement aperture, opposite to the measurement wheel.

6. The cable measurement system and cutter apparatus as claimed in claim 5 comprising:
a disengagement mechanism; and
the disengagement mechanism being operatively coupled to the engagement arm, wherein the disengagement mechanism causes the engagement arm to selectively engage into the measurement aperture.

7. The cable measurement system and cutter apparatus as claimed in claim 1 comprising:
a fixed cutting blade;
the fixed cutting blade being mounted adjacent to the cutting aperture; and
the movable cutting blade being aligned with the fixed cutting blade.

8. The cable measurement system and cutter apparatus as claimed in claim 7 comprising:
a first blade receptacle;
the first blade receptacle being mounted onto the second end of the cutting tool handle; and
the movable cutting blade engaging into the first blade receptacle.

9. The cable measurement system and cutter apparatus as claimed in claim 7 comprising:
a second blade receptacle;
the second blade receptacle being mounted adjacent to the cutting aperture; and
the fixed cutting blade engaging into the second blade receptacle.

10. The cable measurement system and cutter apparatus as claimed in claim 7, wherein the fixed cutting blade and the movable cutting blade each being chamfered to a 45-degree angle.

11. The cable measurement system and cutter apparatus as claimed in claim 1 comprising:
a retention linkage;
a retention protrusion;
the retention linkage being terminally connected to the second end of the cutting tool handle;
the retention protrusion being connected adjacent to an outlet of the material conduit; and
the retention linkage being operatively coupled to the retention protrusion, wherein the retention protrusion retains the cutting tool handle at an angle of 180 degrees or less, relative to the material conduit.

12. The cable measurement system and cutter apparatus as claimed in claim 1 comprising:
a microcontroller;
the microcontroller being mounted within the housing; and
the rotary encoder and the display device being electronically connected to the microcontroller.

13. The cable measurement system and cutter apparatus as claimed in claim 12 comprising:
a speaker;
the speaker being laterally mounted onto the housing; and
the speaker being electronically connected to the microcontroller.

14. The cable measurement system and cutter apparatus as claimed in claim 12 comprising:
a human interface device (HID);
the HID being laterally mounted onto the housing; and
the HID being electronically connected to the microcontroller.

15. The cable measurement system and cutter apparatus as claimed in claim 1, wherein an inlet of the material conduit and an outlet of the material conduit each being a conical aperture.

16. A cable measurement system and cutter apparatus comprising:
a housing;
display device;
a material conduit;
a rotary encoder;
a cutting tool handle
a resistance member;
a movable cutting blade;
a blade aperture;
at least one primary guide wheel;
at least one secondary guide wheel;
a guide wheel aperture;
a displacement slot;
a guide axle;
a linear actuator;
a measurement aperture;
a measurement wheel;
an engagement arm;
a disengagement mechanism;
a fixed cutting blade;
a first blade receptacle;
a second blade receptacle;
a handle retention linkage;
a retention protrusion;
a microcontroller;
a speaker;
an HID;
the display device being laterally mounted onto the housing;
the material conduit traversing through the housing;
the rotary encoder being mounted adjacent to the material conduit;
the rotary encoder being positioned within the housing;
a first end of the cutting tool handle being rotatably connected to the housing;
the resistance member being integrated into the rotatable connection between the first end and the housing;
the movable cutting blade being mounted onto a second end of the cutting tool handle, opposite to the resistance member;
the blade aperture normally traversing through the material conduit;
the primary guide wheel being rotatably mounted adjacent to an inlet of the material conduit;
the secondary guide wheel being rotatably mounted adjacent to an inlet of the material conduit;
the primary guide wheel being positioned opposite to the secondary guide wheel, across the material conduit;
the guide wheel aperture normally traversing through the material conduit;
the primary guide wheel and the secondary guide wheel engaging into the guide wheel aperture;
the linear actuator being integrated in between the guide axle and the displacement slot;
the guide axle normally protruding from the primary guide wheel;
the guide axle engaging into the displacement slot;
the linear actuator being integrated in between the guide axle and the displacement slot;
the measurement aperture normally traversing through the material conduit;
the measurement wheel being rotatably mounted within the housing;
the measurement wheel being positioned offset from an outlet of the material conduit, across the housing;
the measurement wheel engaging into the measurement aperture;
the rotary encoder being rotatably coupled to the measurement wheel;
a fixed end of the engagement arm being rotatably connected to the housing; and
a free end of the engagement arm engaging into the measurement aperture, opposite to the measurement wheel;
the disengagement mechanism being operatively coupled to the engagement arm, wherein the disengagement mechanism causes the engagement arm to selectively engage into the measurement aperture;
the fixed cutting blade being mounted adjacent to the cutting aperture;
the movable cutting blade being aligned with the fixed cutting blade;
the first blade receptacle being mounted onto the second end of the cutting tool handle; and
the movable cutting blade engaging into the first blade receptacle;
the second blade receptacle being mounted adjacent to the cutting aperture;
the fixed cutting blade engaging into the second blade receptacle;
the handle retention linkage being terminally connected to the second end of the cutting tool handle;
the retention protrusion being connected adjacent to an outlet of the material conduit;
the retention linkage being operatively coupled to the retention protrusion, wherein the retention protrusion retains the cutting tool handle at an angle of 180-degrees of less, relative to the material conduit;
the microcontroller being mounted within the housing;
the rotary encoder and the display device being electronically connected to the microcontroller;
the HID being laterally mounted onto the housing; and
the HID being electronically connected to the microcontroller.

17. The cable measurement system and cutter apparatus as claimed in claim 16, wherein the fixed cutting blade and the movable cutting blade each being chamfered to a 45-degree angle.

18. The cable measurement system and cutter apparatus as claimed in claim 16, wherein an inlet of the material conduit and an outlet of the material conduit each being a conical aperture.

* * * * *